Patented Apr. 7, 1925.

1,533,030

UNITED STATES PATENT OFFICE.

JOHAN NICOLAAS ADOLF SAUER, OF AMSTERDAM, NETHERLANDS, ASSIGNOR TO NAAMLOOZE VENNOOTSCHAP NORIT WITSUIKER MAATSCHAPPIJ (ALSO CALLED NORIT WHITE SUGAR COMPANY), OF AMSTERDAM, NETHERLANDS, A CORPORATION OF THE NETHERLANDS.

PURIFYING AND FILTERING PROCESS.

No Drawing. Application filed July 26, 1917. Serial No. 182,879.

*To all whom it may concern:*

Be it known that I, JOHAN NICOLAAS ADOLF SAUER, a subject of the Queen of the Netherlands, and resident of 567 Heerengracht, Amsterdam, Netherlands, have invented certain new and useful Improvements in Purifying and Filtering Processes, of which the following is a specification.

In the purification of sugar liquids and other liquids and liquors, I have made various experiments with a view of obtaining more rapid and more efficient filtration and at the same time a reduction in the amount of purifying material required to secure the desired purification.

When I speak of "purification" or the "desired purification," this may have reference either to the complete or partial removal of suspended or semi-suspended (colloidal) matter, either organic or inorganic, to insure a clear, bright or brilliant liquor, or to obtain a liquor which is clearer and brighter or more brilliant than the original liquor; or to the removal of all or part of the coloring matter to produce a liquor either colorless or at least of lighter color than the original liquor; or to the partial or complete removal of soluble impurities, either organic or inorganic.

The term "purifying material" as used in this specification and in the claims, is to be understood as referring to a material having one or more of the properties just explained with reference to "purification."

The term "sugar liquids" as employed in this specification and in the appended claims, is to be given a broad interpretation, so as to include sugar juices from beets, sugarcane, or other plants, solutions containing sugar obtained from beets, cane, or other plants, invert sugar from beets, cane, or other plants, or glucose from corn, potatoes, etc.

Decolorizing carbon is a substance usually derived from vegetable material and consisting largely of carbon in an amorphous and therefore highly absorbent condition. Decolorizing carbon is brought on the market in several species and under different names, for instance, Norit, Eponit (or Eponite), and Noir Épuré (see U. S. Patents 1,070,654; 1,074,337; 1,176,999; and 1,189,896).

Decolorizing carbon is a general technical name for a special class of carbon with special physical properties and is quite different from ordinary vegetable wood charcoal (woodcarbon or woodchar) or from animal bone-black (animal bone-char) or from blood charcoal, and is much more efficient. Decolorizing carbon is a technical pure amorphous carbon and not a compound of carbon like ordinary wood charcoal. It has a lower specific gravity and a deeper black color than ordinary vegetable wood charcoal. Decolorizing carbon as it is put on the market, contains on 100 dry substance about 90% and more of pure carbon.

A typical high-class decolorizing carbon of the kind now obtainable in the market will contain from 8 to 10% of moisture, while the dry substance which forms the remainder of the decolorizing carbon will consist say of 94% of amorphous carbon and 6% ash, this ash consisting mainly of potassium carbonate, calcium phosphate, calcium phosphate, calcium carbonate, magnesium carbonate, iron phosphate, iron oxid, soluble silica, sand (insoluble silica), traces of copper oxid, chlorine, sodium oxid, etc.

Some hydrogen (about 1.5%) and oxygen (about 2.5%) and to a very small extent also nitrogen (.1%) is present. These substances (hydrogen, oxygen and nitrogen) have to be considered as impurities, and their presence is caused by the technical difficulty of completely carbonizing the vegetable substances which usually form the raw material for the manufacture of decolorizing carbons.

Inferior decolorizing carbons contain from 18 to 60% of ash. High-class decolorizing carbons, such as Norit, Eponit (or Eponite), and Noir Épuré, contain a much smaller proportion of ash.

Substances of animal origin, such as refuse of fish, leather, blood, etc., may also, by processes like those employed for obtaining decolorizing carbon from vegetable substances, be converted into an amorphous technical pure carbon with a high content of pure carbon, which product will have a high absorptive power and consequently great decolorizing, purifying, and filtering efficiency. I therefore desire it to be understood that the term "decolorizing carbon" as used in this specification and in the appended claims, is to be interpreted as covering products of animal origin as well as those of vegetable origin.

Furthermore, a mixture of decolorizing carbon with any other material not harmful to the intended use, and particularly not impairing the filtration of sugar liquids, is to be understood as included in, and covered by, the appended claims, for the reason that the addition of other material, if indifferent or beneficial in its action, will not be objectionable. As a rule, there will be no advantage in adding to the decolorizing carbon, any indifferent material, say kieselguhr, for it adds to the bulk of the mass and does not increase either its decolorizing or its filtering or purifying power, and obviously, the same amount (weight or volume) of unmixed decolorizing carbon will be more efficient than a like amount of a mixture containing decolorizing carbon with an addition of indifferent material. The term "indifferent" as used herein, may be defined as designating any material which has no detrimental action in itself and which does not harm or impair the chemical and physical properties of the decolorizing carbon when used in admixture thereto.

My experiments, in which the purifying material or agent employed was the decolorizing carbon known commercially as "Norit", led to a surprising discovery, which forms the subject-matter of my present application. I found that when using decolorizing carbon (for instance Norit) as a purifying material in relatively low percentages, a particular degree of purity could be obtained in the purified juice or liquid, but the rate of flow remained relatively low, so that the operation required a considerable length of time. Moreover, when employing a low percentage of the purifying agent, it was found that at the end of the purifying operation, the purifying material was spent, that is to say, it was unsuitable for a second purifying operation, and had either to be thrown away as waste, or regenerated according to some well-known or approved process (see the four U. S. patents mentioned above). The ordinary practice hitherto has been to use as low a percentage of purifying material as possible which will still give a satisfactory result, the intention being to secure greater economy in this way.

I have discovered that when the percentage of the purifying material or agent is increased beyond a certain point, which I will term the "critical" percentage, the process is completed to the point at which the liquid has the desired degree of purity, without exhausting the purifying material, that is to say, in this case it is possible to use the purifying material repeatedly before it becomes exhausted to the point of requiring renewal or regeneration. Furthermore, a considerable saving in the time required for separation or filtration was obtained by this procedure, as well as a material reduction in the amount of purifying agent necessary for the treatment of the same amount of sugar liquid or other liquid.

The relations will be understood best by the following example, which however is to be taken as illustrative rather than as defining the best conditions. Let us assume that the liquid, say a sugar liquid, is to be treated in quantities or batches of equal amount (say, 10 tons each). If we employ a very low percentage of the Norit or other agent, the desired degree of purity of the filtered liquid can be obtained, but the rate of flow during filtration is relatively slow in this case and the filtration therefore has to be continued for a relatively considerable length of time. If we gradually increase the percentage of purifying agent per batch, the time required to secure the desired degree of purity is shortened. Still, as long as the percentage of purifying agent remains below a certain critical point (which depends on various conditions, such as the nature of the liquid under treatment and quantity and nature of the impurities contained therein, the density and temperature of the liquid, the character of the filtering agent, the pressure under which the operation is carried out, etc.), it is found that the filtering material will have become spent or unserviceable at the end of the operation, that is to say, the filtering material will be suitable (without renewal or regeneration) for a single operation only. As soon as this critical percentage is exceeded, however, there is not only (as might be expected) a further shortening of the time required for the completion of filtration, together with a more intense purification, but (and this is the surprising feature of my discovery) the purifying material is not spent when the desired purity (that is to say, not an intermediate, but a final degree of purity) of the liquid has been attained, and such material may therefore be used again without renewal or regeneration on another batch of fresh or untreated liquid.

Not only may the filtering material be used over again in such a case, but there is a substantial saving in material and in the time required for the filtration. Thus, let us assume that with 10 tons of sugar in the form of a liquor of say 60° Brix, the best time of filtration which can be obtained by treatment with a certain percentage of Norit (say, ½ of 1 per cent,), is two hours, and that this percentage is the "critical" percentage, that is to say, the highest percentage which will yield a practical exhaustion of the purifying material upon the attainment of the desired time of filtration and the desired degree of purity of the sugar liquid. Now, if we employ a higher percentage of purifying material (with the same filtering area), say ¾ of 1 per cent., the filtration of the same amount of sugar liquid, say 10 tons as assumed above, will require only 1½ hours, and then the same purifying material, instead of being spent, will be available, without any intermediate regenerating treatment, for the like or repeated treatment of a second batch (10 tons) of fresh or untreated sugar liquid, and if the percentage of purifying material is still higher, the same purifying material will do for a third, fourth, etc. treatment, acting each time on a like batch (10 tons) of fresh, untreated sugar liquid or other liquid. For instance, by increasing the percentage say to 3%, the purifying material might be used for ten successive treatments of fresh or untreated sugar liquid before becoming exhausted, and with this percentage, a much shorter time, say ½ hour will suffice for each treatment. Theoretically, the time required for each of the successive treatments will increase progressively, but in any case the average time required for the treatment of each amount or batch is much less than the two hours which was the minimum obtainable when using a percentage of purifying material not exceeding the "critical" percentage. In practice, for the sake of simplicity, it will generally be preferred to filter each batch for the same length of time, this time being the one required for the proper filtration of the last batch; thus, the preceding batches will in this case be filtered somewhat longer than strictly necessary (say, by pumping at a slower rate), but of course this prolonging of the treatment is not detrimental. It will also be observed that if the critical percentage is designated as $c$, and the percentage actually used (according to my present invention) is $mc$ ($3=6 \times \frac{1}{2}$ in the example, where the "critical" percentage is assumed as ½), the number of repetitions, $n$, that may be employed ($n$ being equal to 10 in the particular example) will be greater than the factor $m$ (6 in the example) indicating the ratio of the percentage used to the critical percentage $c$. From this it follows that the average percentage $\left(\frac{mc}{n}\right.$ or, in the particular example, $\frac{3}{10}=.3$) of purifying material (per batch of 10 tons) will be less when using a percentage above the critical percentage, than when using only the critical percentage (½ of 1 per cent in the example). There is therefore a double economy, of purifying material and of time as well, and of course there is the additional advantage of avoiding frequent renewal or regeneration of the purifying material, with the attendant expense and loss of time and of purifying material, since every regeneration involves a certain loss.

The term "critical percentage" may seem rather indefinite, but in practice there will be no difficulty in ascertaining it for each individual case, the critical percentage being defined as the highest percentage which will entail a practical exhaustion of the purifying material at the end of the purifying operation, when the desired degree of purity has been attained.

If after using a certain percentage of decolorizing carbon for purifying a liquid, it is found that the used decolorizing carbon is still active on liquid of the same character (fresh or untreated) and does not need to be regenerated, this in itself shows conclusively that the purifying material (decolorizing carbon) was used in a proportion above the critical percentage.

The following examples will illustrate the improvement obtained by my new process:

Let A designate the total coloring matter (100%) in the original sugar solution, B the total (100%) soluble ash content (inorganic or mineral matter) in the original sugar solution, C the total (100%) organic matter (organic non-sugars as gums, pectins and other slimy substances, coloring matter etc.) present in solution or semi-suspension (colloidal solution) in the original sugar solution, D the total (100%) organic matter (fibre, organic acid compound etc.) in suspension and inorganic matter (phosphates and sulfate of lime etc.) present in the original sugar solution, in suspension and in semi-suspension, and E the time or duration of filtration in minutes (when using filter presses and up to 60 lbs. of pressure per square inch.)

*First example.*

If say 1 part (by weight) of a certain commercial decolorizing carbon such as Norit, Eponit (or Eponite), Noir Épuré etc. is used to 100 parts (by weight) of raw, unwashed cane sugar of the following composition:

| | Per cent |
|---|---|
| Polariscope (sugar) | 96.5 |
| Soluble ash | .35 |
| Insoluble ash | .15 |
| Invert sugar | 1.2 |
| Moisture | 1.0 |
| Organic non-sugar and undetermined matter | .8 |
| | 100.00 | in a solution of say 60 degrees Brix hot at a temperature of 180° Fahrenheit and in batches of 10 metric tons, the removal of A is say 85%; B is say 1%; C is say 40%; D is say 100%, and the time of filtration; E is say 75 minutes.

We will assume that the percentage named (1%) is the critical percentage of the particular decolorizing carbon with respect to the particular sugar solution.

If 3% of this decolorizing carbon is used on 100 parts of cane sugar of the same composition in a solution of the same density and temperature and on batches of like amount, the removal and the time of filtration will be as follows:

|  | A | B | C | D | E |
|---|---|---|---|---|---|
|  | Per cent | Per cent | Per cent | Per cent | Mins. |
| First time of use | 95 | 5 | 50 | 100 | 40 |
| Second time of use | 93 | 4 | 48 | 100 | 46 |
| Third time of use | 91 | 3 | 46 | 100 | 48 |
| Average after three times of use working out at 1% decolorizing carbon on 100 parts cane sugar | 93 | 4 | 48 | 100 | 45 |
| Fourth time of use | 90 | 3 | 44 | 100 | 48 |
| Fifth time of use | 89 | 3 | 42 | 100 | 50 |
| Sixth time of use | 88 | 2 | 41 | 100 | 50 |
| Average after six times of use working out at only ½% decolorizing carbon on 100 parts of cane sugar | 91 | 3.3 | 46 | 100 | 47 |

Second example.

If say 1 part (by weight) of a commercial fresh or of a regenerated decolorizing carbon (regenerated in the well-known manners i. e. by using alkalies, or by alkalies and reburning, see the U. S. patents mentioned above) is used to 100 parts (by weight) of a washed, raw cane sugar of the following composition:

|  | Per cent |
|---|---|
| Polariscope (sugar) | 99.40 |
| Soluble ash | .04 |
| Insoluble ash | .03 |
| Invert sugar | Trace |
| Moisture | |
| Organic non-sugar and undetermined | .53 |
|  | 100.00 | in a solution of say 60 degrees Brix hot at a temperature of 180° Fahrenheit, and in batches of 10 metric tons, the removal of A is say 95%; B is say 1%; C is say 40%; D is say 100%, and the time of filtration; E is say 40 minutes.

Here again we assume that 1% is the critical percentage of the particular decolorizing carbon with respect to the particular sugar solution.

If 3% of the decolorizing carbon is used on 100 parts of the same cane sugar or of a raw sugar of the same composition in a solution of the same density and temperature, and on batches of like amount, the removal and the time of filtration will be as follows:

|  | A | B | C | D | E |
|---|---|---|---|---|---|
|  | Per ct. | Per ct. | Per ct. | Per ct. | Mins. |
| 1st time of use | 99 | 5 | 60 | 100 | 30 |
| 2nd time of use | 98 | 4 | 58 | 100 | 35 |
| 3rd time of use | 97 | 3 | 56 | 100 | 36 |
| Average after three times of use working out at 1% decolorizing carbon on 100 parts of cane sugar | 98 | 4 | 58 | 100 | 34 |
| 4th time of use | 97 | 3 | 54 | 100 | 36 |
| 5th time of use | 96 | 3 | 52 | 100 | 37 |
| 6th time of use | 95 | 2 | 51 | 100 | 40 |
| Average after six times of use working out at 1% decolorizing carbon on 100 parts of cane sugar | 97 | 3.3 | 56 | 100 | 35 |

Third example.

If the sugar solution referred to in Example I is treated under the same conditions with 1% of an improved and more active decolorizing carbon (such as is produced by a special acid treatment set forth in another application filed by me simultaneously herewith), the removal of A is say 94%; B is say 30%; C is say 60%; D is say 100%, and the time of filtration; E is say 50 minutes.

We will assume that the percentage named (1%) again is the critical percentage of the particular decolorizing carbon with respect to the particular sugar solution.

If 3% of this decolorizing carbon (acid-treated) is used on 100 parts of cane sugar of the same composition in a solution of the same density and temperature, the removal and the time of filtration will be as follows:

|  | A | B | C | D | E |
|---|---|---|---|---|---|
|  | Per ct. | Per ct. | Per ct. | Per ct. | Mins. |
| 1st time of use | 98 | 50 | 60 | 100 | 20 |
| 2nd time of use | 97 | 45 | 58 | 100 | 22 |
| 3rd time of use | 96 | 40 | 56 | 100 | 22 |
| Average after three times of use working out at 1% decolorizing carbon on 100 parts of cane sugar | 97 | 45 | 58 | 100 | 21 |

I desire it to be understood, however, that the above examples are illustrative only, and that they simply indicate results such as may be obtained with cane sugar of the composition given above. The removal of the various substances especially those in solution depends very much on the nature (quantity and quality) of certain constituents or impurities, and particularly of those contained in the soluble ash, the insoluble ash, and the organic non-sugar and undetermined matter. That is to say, the analyses given above will fit raw sugar of different characteristics as to the nature of certain important impurities, and I do not wish to be misunderstood as stating that all solutions of sugar fitting the same analysis as given above, will yield the exact results indicated.

The new process yields increased efficiency as to the amount of coloring matter, ash, organic non-sugar, etc. removed from the sugar liquid per unit of "Norit" or similar agent employed, and also very considerably reduces the time of filtration as compared with the result that is obtained when "Norit" is used at or below the critical percentage (with conditions otherwise equal).

After treatment with "Norit," filtration with bone-char may be resorted to in some cases for completing the removal of certain impurities, but this as a rule will be done only with the later batches, the initial batch or batches treated with "Norit" above the critical percentage being so highly decolorized that a finishing treatment with bone-char is quite superfluous.

Norit or like purifying agents or materials, after repeated use according to the process described herein, may be regenerated in various ways, and particularly with the aid of hydrochloric acid as set forth in another application for patent which I am filling concurrently herewith, Serial No. 182,881.

In practice, decolorizing carbon may be added to the sugar liquids at any temperature, but preferably it is added at a rather high temperature, from 160° Fahrenheit up to the boiling point. The decolorizing carbon for instance is mixed with the sugar liquids preferably in tanks provided with agitating means, such as stirrers and stirring gear, or means for blowing in air, and with steam coils either perforated or with solid walls (that is, with direct or indirect steam heating). The sugar liquids are preferably heated during the mixing with decolorizing carbon (the time of contact may vary and be from say less than one minute upwards), and are then filtered off over suitable filter-cloth in open or closed filters of any type or in filter presses of any kind, or separated off by centrifugal force or through decantation, but preferably by pumping through ordinary plate-and-frame presses provided with a washing-out device.

The cakes formed in the filters or presses are washed out with hot or cold water or with steam or by any other suitable means to extract the sugar, but preferably with hot water and steam. Compressed air can be used with advantage, first before washing to remove a great part of the sugar liquid and afterwards, after washing with water or steam, to remove a great part of the water from the decolorizing carbon cakes in the press.

By following this procedure, I obtain a saving in wash water, and the cakes of decolorizing carbon are better dried and are then easier removed from the filter-press cloth. The wash water off the press remains pure, as practically none of the absorbed substances, except the sugar, are extracted out of the decolorizing carbon by the washing out with water. The wash water can therefore be used at once to dissolve sugar again in sugar refinery practice.

The amount of decolorizing carbon employed depends on the liquid treated and on the impurities it contains. For washed cane sugar of a purity of 99% (polariscope) or over, from 1 to 3% of decolorizing carbon is usually sufficient. Molasses will require a higher percentage of decolorizing carbon, say from 3% up. With very viscous juices, for instance juices from unripe canes or from frozen beets a larger quantity of decolorizing carbon would naturally be used than with normal juices from ripe and healthy canes or beet roots, while also a cane-sugar or beet-sugar solution of high purity requires less decolorizing carbon than a cane-sugar or beet-sugar solution of lower purity. For washings from affination (refining) turbines treating raw cane sugar, from 6 to 8% of decolorizing carbon will be suitable if the purity is about 90% and from 8 to 10% of decolorizing carbon if the purity is about 80%. Of course, I do not restrict myself to these proportions.

The term "purity" as used in this specification, is to be understood as referring to the partial or entire freedom of the liquid under treatment, from one or more of the substances or impurities it is desired to remove, as explained at the beginning of this specification with reference to "purification," and particularly partial or entire freedom from those substances which oppose the greatest resistance to the action of the particular purifying material employed. Thus it is possible for a liquid to have a higher degree of purity (as just defined) than another liquid, that is to say, this purer liquid will contain a smaller proportion of substances opposing a relatively great resistance to the action of the particular purifying material employed, and yet this liquid, having a higher degree of "purity" in the particular sense explained, may at the same time contain a larger proportion of other impurities, which however are not the ones comparatively refractory to the action of the particular purifying material employed.

I claim:

An improvement in the process of decolorizing and purifying sugar-containing liquid by treating separate batches of such liquid, with finely divided decolorizing carbon, which comprises the steps of adding to the first of a plurality of batches of said liquid containing coloring matter and impurities, a decolorizing carbon containing not substantially less than 90% of actual carbon, figured on the dry basis, in an amount which is at least a multiple of the amount necessary to effect the desired degree of purification of that batch of liquid, and thereafter separating the said decolorizing carbon from the liquid, adding such carbon in its partly soiled condition without intermediate revivification, to another batch of that same liquid, thereafter separating said decolorizing carbon from such second batch of liquid, and repeating such operations upon further successive batches of that same liquid, with the same decolorizing carbon without intermediate revivification thereof, until sufficient degree of purification of substantially more batches of liquid is secured than corresponding to the ratio of amount of decolorizing carbon used to amount necessary for the treatment of a single batch of liquid, without the necessity of subjecting most of said batches of liquid to more than one treatment with decolorizing carbon and one separation treatment, and whereby the time necessary for any filtration of the liquid is greatly reduced.

In testimony whereof I have signed this specification.

JOHAN NICOLAAS ADOLF SAUER.